(12) United States Patent
Woodcock (10) Patent No.: US 11,845,396 B1
(45) Date of Patent: Dec. 19, 2023

(54) VEHICLE FLEET AND ACCESS MANAGEMENT SYSTEM

(71) Applicant: Gerald C. Woodcock, Murrieta, CA (US)

(72) Inventor: Gerald C. Woodcock, Murrieta, CA (US)

( * ) Notice: Subject to any disclaimer, the term of this patent is extended or adjusted under 35 U.S.C. 154(b) by 0 days.

(21) Appl. No.: 18/240,102

(22) Filed: Aug. 30, 2023

Related U.S. Application Data (60) Provisional application No. 63/413,226, filed on Oct. 4, 2022.

(51) Int. Cl.
*B60R 25/20* (2013.01)

(52) U.S. Cl.
CPC .................................. *B60R 25/20* (2013.01)

(58) Field of Classification Search
CPC ..................................................... B60R 25/20
See application file for complete search history.

(56) References Cited

U.S. PATENT DOCUMENTS

| | | | |
|---|---|---|---|
| 7,312,691 B2 | 12/2007 | Zambo | |
| 9,894,526 B2 | 2/2018 | Giraud | |
| 10,445,389 B2 | 10/2019 | Endras | |
| 10,536,827 B2 | 1/2020 | Lee | |
| 10,885,731 B2 | 1/2021 | Menard | |
| 11,282,312 B2 | 3/2022 | Determann | |
| 2005/0248436 A1 | 11/2005 | Hohmann | |
| 2006/0202799 A1* | 9/2006 | Zambo | B60R 25/04 340/5.72 |
| 2018/0091930 A1* | 3/2018 | Jefferies | G07C 9/00571 |
| 2021/0035390 A1* | 2/2021 | Determann | G07C 9/00857 |

FOREIGN PATENT DOCUMENTS

WO     2012/175174     12/2012

* cited by examiner

*Primary Examiner* — Tarek Elarabi
(74) *Attorney, Agent, or Firm* — Critical Path IP Law, LLC (57) ABSTRACT

Systems and methods to manage and document user access to a set of vehicles in a vehicle dealership or fleet setting are provided. In one aspect, a dongle device is uniquely installed in each vehicle. The dongle communicates with a vehicle's controller to allow vehicle access. A user interacts with the dongle through a portable electronic device. The dongle is uniquely and permanently coded, by way of the VIN for example, to a particular vehicle. The user communicates at least some of the VIN to the dongle to request vehicle access. Vehicle access and other data associated with accessed vehicles are recorded as subject to terms and conditions established and maintained through a central database. Vehicle access data, such as vehicle access timings, allow a dealership to assess business operational data, such as salesperson vehicle access tempo and breadth, and buyer interest in vehicles or groups of vehicles.

18 Claims, 5 Drawing Sheets

VEHICLE FLEET AND ACCESS MANAGEMENT SYSTEM

CROSS-REFERENCE TO RELATED APPLICATION

This application is a nonprovisional patent application of and claims the benefit of U.S. Provisional Patent Application No. 63/413,226 titled "Vehicle Access Management System" filed Oct. 4, 2022, the disclosure of which is hereby incorporated herein by reference in entirety.

FIELD

The disclosure relates generally to systems and methods involving user access to and management of vehicles, and specifically to systems and methods to manage and document user access to a set or fleet of vehicles such as in a vehicle dealership setting.

BACKGROUND

Conventional approaches for access to vehicles by vehicle personnel in vehicle dealership settings require use of physical keys or key fobs. A key is checked out at a central dealership location by a vehicle salesperson who accesses a vehicle, such as to show the vehicle to a perspective buyer. The key is then returned to the central dealership location. The use of physical keys is inefficient for many reasons, to include time lost in accessing and returning keys and searching for lost or misplaced keys. Also, no record of the key or vehicle access is maintained. The dealership thus has no insight into data that would assist in business operations, to include, for example, employee management, vehicle security, and buyer interest.

What is needed is a system or method to manage, monitor, and analyze interactions between those accessing vehicles and the vehicles, such as sales employees and vehicles for sale. The disclosure solves this need by providing systems and methods to manage and document multiple user access to a set of vehicles such as in a vehicle dealership setting. A dongle device is uniquely installed in each vehicle of a vehicle dealership, the dongle device communicating with a vehicle's controller to allow vehicle access. A salesperson user interacts with the dongle device through a portable electronic device, such as a smart phone. The dongle device is uniquely and permanently coded, by way of the VIN for example, to a particular vehicle. The user communicates at least some of the VIN to the dongle to request vehicle access. Vehicle access and other data are recorded and subject to terms and conditions established and maintained through a central database. The vehicle access data, such as access timing, allow a dealership to assess a variety of business operational data, such as salesperson vehicle access tempo and breadth, and buyer interest in particular vehicles or groups of vehicles. No physical keys to any vehicles are required.

SUMMARY

A vehicle fleet and access management system is disclosed which manages, controls, monitors, and analyzes user access to a fleet of vehicles.

In one embodiment, a vehicle fleet and access management system is disclosed, the system comprising: a first dongle device configured to communicate with a first vehicle controller of a first vehicle, the first vehicle having a set of first vehicle states comprising a first vehicle lock state, the first vehicle controller operating to at least set the first vehicle lock state to locked and unlocked; a first user device of a first user, the first user device configured to communicate with a first set of dongle devices comprising the first dongle device; and a central device comprising a central database; wherein: when the first user device is authorized to set the first vehicle lock state and when the first dongle device is communicating with the first vehicle controller: the first user device communicates with the first dongle device to change, at a time stamp one value, the first vehicle locked state from locked to unlocked; the first user device communicates with the first dongle device to change, at a time stamp two value, the first vehicle lock state from unlocked to locked; and the first user device communicates the time stamp one value and the time stamp two value to the central device; and the central device records the time stamp one value and the time stamp two value.

In one aspect, the first dongle device communicates with an on-board diagnostics port of the first vehicle. In another aspect, the communication between the first user device and the first dongle device is blue tooth communication. In another aspect, the first dongle device is permanently coded to a first vehicle VIN and the first dongle device stores at least part of the first vehicle VIN. In another aspect, the central device stores a first vehicle set of terms and conditions associated with access control to the first vehicle; and the first user device is authorized to change the first vehicle lock state only when the first vehicle set of terms and conditions are satisfied. In another aspect, the first user, by way of the first user device, communicates at least part of the first vehicle VIN to the first dongle device to enable the first dongle device to change the first vehicle lock state from locked to unlocked. In another aspect, the set of first vehicle states further comprises at least one of first vehicle fuel level and first vehicle engine status; and the central device further records the set of first vehicle states when the first dongle device is communicating with the first vehicle controller. In another aspect, the first set of dongle devices further comprises a second dongle device configured to communicate with a second vehicle controller of a second vehicle, the second vehicle having a set of second vehicle states; when the first user device is authorized to set a second vehicle lock state and when the second dongle device is communicating with the second vehicle controller: the first user, by way of the first user device, communicates at least part of the second vehicle VIN to the second dongle device to enable the second dongle device to change the second vehicle lock state from locked to unlocked; and the central device further records the set of second vehicle states when the second dongle device is communicating with the second vehicle controller. In another aspect, the system further comprises a second user device of a second user, the second user device configured to communicate with a second set of dongle devices comprising the first dongle device, the second dongle device, and a third dongle device configured to communicate with a third vehicle controller of a third vehicle, the third vehicle having a set of third vehicle states; wherein: when the second user device is authorized to set a third vehicle lock state and when the third dongle device is communicating with the third vehicle controller: the second user, by way of the second user device, communicates at least part of the third vehicle VIN to the third dongle device to enable the third dongle device to change the third vehicle lock state from locked to unlocked; and the central device further records the set of third vehicle states when the third dongle device is communicating with the third dongle device.

In another embodiment, a method of vehicle fleet and access management is disclosed, the method comprising: providing a first dongle device configured to communicate with a first vehicle controller of a first vehicle, the first vehicle having a set of first vehicle states comprising a first vehicle lock state, the first vehicle controller operating to at least set the first vehicle lock state to locked and unlocked; installing the first dongle device in the first vehicle; providing a first user device to a first user, the first user device configured to communicate with a first set of dongle devices comprising the first dongle device; providing a central device comprising a central database; positioning the first user device adjacent the first vehicle at a first distance; establishing communication between the first user device and the first dongle device; determining if the first user device is authorized to set the first vehicle lock state; wherein if the first user device is authorized to set the first vehicle lock state: communicating an instruction, at a first time stamp one value, from the first user device to the first dongle device to change the first vehicle from locked to unlocked; communicating an instruction, at a first time stamp two value, from the first user device to the first dongle device to change the first vehicle from unlocked to locked; and recording, on the central device, the first time stamp one value and the first time stamp two value.

In one aspect, the first dongle device is coupled to an on-board diagnostics port of the first vehicle and the communication between the first user device and the first dongle device is blue tooth communication. In another aspect, the central device stores a first vehicle set of terms and conditions associated with access control to the first vehicle; and the first user device is authorized to set the first vehicle lock state only when the first vehicle set of terms and conditions are satisfied. In another aspect, the set of first vehicle states further comprises at least one of first vehicle fuel level and first vehicle engine status; and the central device further records the set of first vehicle states when the first dongle device is communicating with the first vehicle controller. In another aspect, the first dongle device is permanently coded to a first vehicle VIN and the first vehicle controller stores at least part of the first vehicle VIN. In another aspect, the first user, by way of the first user device, communicates at least part of the first vehicle VIN to the first dongle device to enable the first dongle device to change the first vehicle from locked to unlocked. In another aspect, if the first distance exceeds a selectable threshold distance, the first vehicle remains locked or changes to locked. In another aspect, the method further comprises the steps of: providing a second dongle device configured to communicate with a second vehicle controller of a second vehicle, the second vehicle having a set of second vehicle states comprising a second vehicle lock state, the second vehicle controller operating to at least set the second vehicle lock state to locked and unlocked; installing the second dongle device in the second vehicle; establishing communication between the second user device and the second dongle device; determining if the first user device is authorized to set the second vehicle lock state; wherein if the first user device is authorized to set the second vehicle lock state: the first user, by way of the first user device, communicates at least part of the second vehicle VIN to the second dongle device to enable the second dongle device to change the second vehicle lock state from locked to unlocked; and the central device further records the set of second vehicle states when the second dongle device is communicating with the second vehicle controller. In another aspect, the method further comprises the steps of: providing a second user device to a second user, the second user device configured to communicate with a second set of dongle devices comprising the first dongle device, the second dongle device, and a third dongle device configured to communicate with a third vehicle controller of a third vehicle, the third vehicle having a set of third vehicle states; determining if the second user device is authorized to set the third vehicle lock state; wherein if the second user device is authorized to set the third vehicle lock state: the second user, by way of the second user device, communicates at least part of the third vehicle VIN to the third dongle device to enable the third dongle device to change the third vehicle lock state from locked to unlocked; and the central device further records the set of third vehicle states when the third dongle device is communicating with the third dongle device.

In yet another embodiment, a vehicle fleet management system is disclosed, the system comprising: a plurality of dongles configured to uniquely communicate with a vehicle controller of a respective plurality of vehicles, each of the plurality of vehicles having a plurality of vehicle states comprising a vehicle lock state of locked and unlocked; a plurality of users, each user associated with a respective plurality of user devices, each of the plurality of user devices configured to communicate with each of the plurality of dongles; and a central device comprising a central analytics engine, a central database storing a set of terms and conditions for engagement by each of the plurality of users with respect to each of the plurality of vehicles, and a central processor configured to determine satisfaction of each of the plurality of users with the set of terms and conditions for each of the plurality of vehicles; wherein: a first user device of a first user of the plurality of users communicates with a first dongle of a first vehicle and, if the central processor determines the first user satisfies the set of terms and conditions of the first vehicle, the first vehicle user device instructs the first dongle to set one or more first vehicle states of the first vehicle and first vehicle state data are recorded by the central database; a second user device of a second user of the plurality of users communicates with a second dongle of a second vehicle and, if the central processor determines the second user satisfies the set of terms and conditions of the second vehicle, the second vehicle user device instructs the second dongle to set one or more second vehicle states of the second vehicle and second vehicle state data are recorded by the central database; the one or more first vehicle states is a first vehicle lock state and the first vehicle state data comprise a time of the first dongle setting the first vehicle lock state; the one or more second vehicle states is a second vehicle lock state and the second vehicle state data comprise a time of the second dongle setting the second vehicle lock state; the first dongle is permanently coded to a first vehicle VIN and the first dongle stores at least part of the first vehicle VIN; and the second dongle is permanently coded to a second vehicle VIN and the second dongle stores at least part of the second vehicle VIN.

In one aspect, the first user device communicates with a plurality of dongles of a respective plurality of vehicles and sets at least one vehicle state of each of the plurality of vehicles, the vehicle state of each of the plurality of vehicles recorded by the central database and accessed by the central analytic engine; the second user device communicates with a plurality of dongles of a respective plurality of vehicles and sets at least one vehicle state of each of the plurality of vehicles, the vehicle state of each of the plurality of vehicles recorded by the central database and accessed by the central analytic engine; and the central analytics engine tabulates vehicle state of each of the second of vehicles as a function of time and user device.

The term "VIN" means vehicle identification number, a unique number associated with a particular vehicle.

The term "dongle" means a relatively small electronic device able to be connected to a relatively larger electronic device, the dongle providing or enabling specialized functions.

The term "pairing" between two devices, such as two electronic devices, means establishing at least a communications connection that allows data transfer, and in some cases, also establishing a physical connection.

By way of providing additional background, context, and to further satisfy the written description requirements of 35 U.S.C. § 112, the following references are incorporated by reference in their entireties: U.S. Pat. No. 11,282,312 to Determann; U.S. Pat. No. 7,312,691 to Zambo; U.S. Pat. No. 9,894,526 to Giraud; U.S. Pat. No. 10,885,731 to Menard; U.S. Pat. No. 10,536,827 to Lee; and U.S. Pat. No. 10,445,389 to Endras; U.S. Pat. Publ. No. 2005/0248436 to Hohmann; and World IP Organization Publ. No. WIPO 2012/175174 to Fesefeldt.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g., analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The disclosed devices, systems, and methods of use will be described with reference to FIGS. 1-5. Generally, systems and methods to manage, control, and document user access to a set of vehicles such as in a vehicle dealership setting are disclosed.

Systems and methods to manage and document user access to a set of vehicles in a vehicle dealership setting are provided. In one aspect, a dongle device is uniquely installed in each vehicle of a vehicle dealership. (The phrase "uniquely installed" means that the dongle device only couples or interacts or communicates with a single unique vehicle, i.e., a particular dongle will only operate with a single vehicle.) The dongle communicates with a vehicle's controller (or set of controllers of a single vehicle) to allow vehicle access. A salesperson interacts with the dongle through a portable electronic device. The dongle is uniquely and permanently coded, by way of the VIN for example, to a particular vehicle. The user may communicate at least some of the VIN to the dongle to request vehicle access. Vehicle access (and, in some embodiments, and/or vehicle state data as described below) is recorded. Vehicle access, and/or other interaction with a vehicle to include changing of the state of the vehicle, are subject to terms and conditions established and maintained through a central database. As an example, one term and condition may be that only specific sales employees may drive certain vehicles, other employees may only access but not drive a vehicle, and some vehicles are not accessible at all to certain vehicles. Other terms and conditions may limit starting a vehicle only during designated times (e.g., during dealership hours). Violation or not satisfying a term or condition will disable that function or state, e.g., if a term governing hours of allowed engine running are violated, the engine will shut off. Vehicle access data, such as vehicle access timings and any changes to vehicle state, allow a dealership to assess a variety of business operational data, such as salesperson vehicle access tempo and breadth, and buyer interest in particular vehicles or groups of vehicles.

Figure 1:
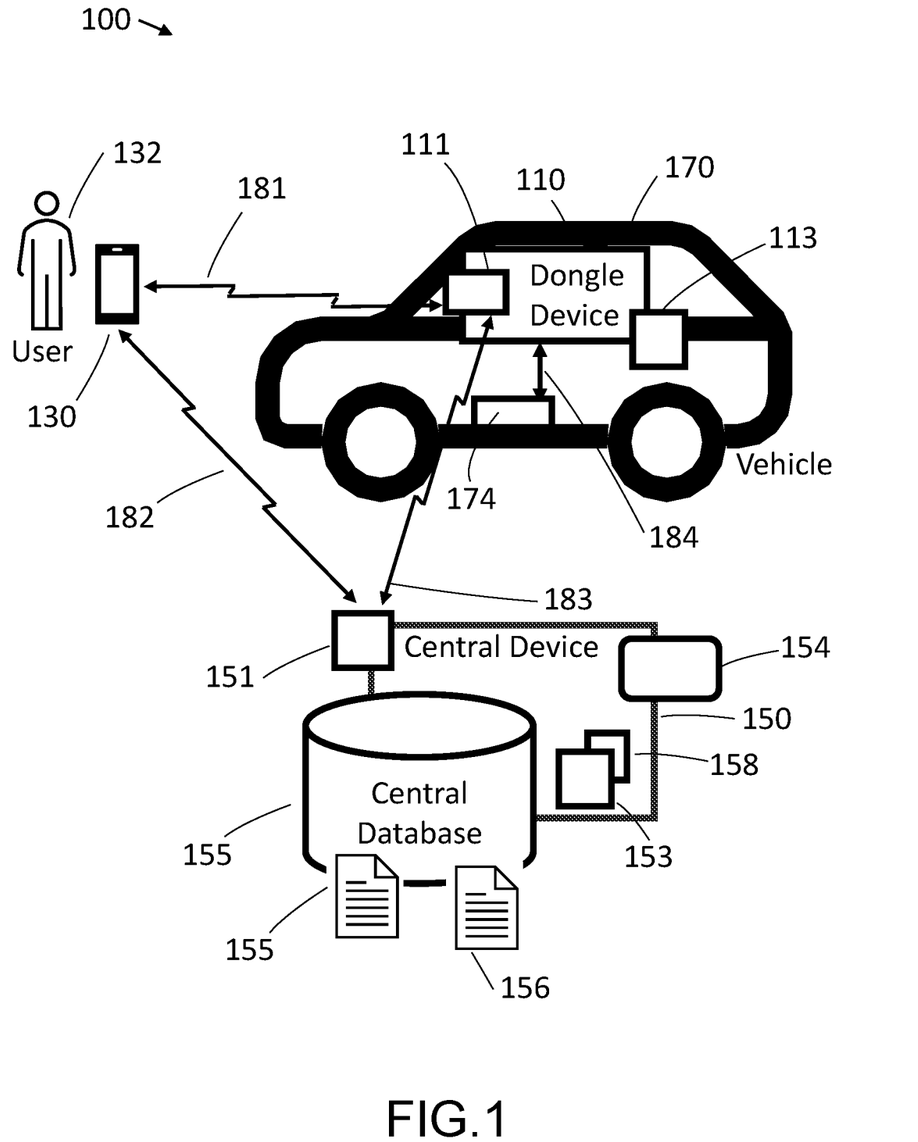
FIG. 1 is a depiction of one embodiment of a vehicle fleet and access management system of the disclosure.

With attention to FIG. 1, one embodiment of a vehicle fleet and access management system 100 is depicted. With attention to FIG. 2, one embodiment of a method of use 200 of the vehicle fleet and access management system 100 of FIG. 1 is depicted. The phrases "fleet and access system" or "fleet system" or "access system" or simply the term "system," or the phrases "fleet and access method" or "fleet method" or "access method" or simply the term "method," may refer to any of the embodiments of the disclosure which involve any collection of the features described in the disclosure and is not limiting.

Generally, a user 132 interacts with the system 100 by way of user device 132. The system comprises user device 130, dongle device 110 (also referred to as dongle 110), and central device 150. Comm one 181 provides communication between the user device 130 and the dongle device 110 via the dongle transceiver 111. Comm two 182 provides communication between the user device 130 and the central device 150 via the central transceiver 151. Comm three 183 provides communication between the dongle device 110 and the central device 150.

The various communication links of FIG. 1, to include comm one 181, comm two 182, and comm three 183, may be of any wireless type or protocol known to those skilled in the art, to include, e.g., Bluetooth, Bluetooth low energy, ZigBee, cellular networks to include 4G and 5G, WiMAX, and other wireless networking types or protocols.

The user device 130 may be any portable electronic device that provides a user interactive display such as a GUI and a communication function such as wireless communication (Wi-Fi or wife). (The phrase "user interface" or "UI", and the phrase "graphical user interface" or "GUI", means a computer-based display that allows interaction with a user with aid of images or graphics). In one embodiment, the user device 130 is a smart phone. User device 130 is configured to communicate with dongle device 110 as comm one 181. User device 130 is configured to communicate with central device 150 as comm two 182. In one embodiment, the user device 130 and/or dongle 110 use blue tooth communication, such as Bluetooth low energy. The user device 130 may employ or use any communication standard or protocol known to those skilled in the art. The interactive display of the user device 130 allows a user 132 to input and/or access data (either manually or automatically or semi-automatically), such as input various vehicle access data (e.g., all or part of the VIN of vehicle 170), input a request to unlock or lock the vehicle 170, and access the vehicle 170 data such as vehicle trim package data. In one embodiment, the user provides the last six values (or other set) of the VIN. In one embodiment, the user provides a unique stock number of the vehicle or any other unique vehicle number, as used additionally or alternatively to the VIN.

Also, the interactive display of the user device 130 allows a user 132 to interact with the central device 150, such as to view or access data of the central database 155 of the central device 150 that establishes terms and conditions of user 132 access to the vehicle 170, as described in more detail below.

In one embodiment, the user device 130 comprises a system app that performs one or more of the functions described above with respect to the user device 130. For example, the system app may allow the user, by way of the system app, to input and/or access data, such as input various vehicle access data (e.g., all or part of the VIN of vehicle 170), input a request to unlock or lock the vehicle 170, and access the vehicle 170 data such as vehicle trim package data. (The term "app" or "application" means a software program that runs as or is hosted by a computer, typically on a portable computer to include a portable computer such as user device 130 or smart phone and includes a software program that accesses web-based tools, APIs and/or data). In one embodiment, the user device and/or the app includes standard security features, such as username and password and other measures known to those skilled in the art.

The dongle device 110 comprises dongle transceiver 111 and dongle processor 113. The dongle 110 connects to a vehicle controller 174 of the vehicle 170 through dongle-vehicle connection 184. In one embodiment, the dongle-vehicle connection 184 is a port connection such as a male-female plug-in type connection. In one embodiment, the dongle device 110 communicates with and connects with an on-board diagnostics port of the vehicle 170.

In one embodiment, the dongle-vehicle connection 184 is a wireless connection.

The dongle transceiver 111 is configured for comm one 181 communications with user device 130 and/or for comm three 183 communications with central device 150.

The dongle processor 113 may enable the dongle device 110 to communicate with other devices as described above and/or may enable the dangle to be initialized with a particular vehicle by way of dongle-vehicle connection 184. The dongle processor 113 may enable the dongle to be matched or initialized to a particular vehicle 170, such as through the VIN of vehicle 170. In one embodiment, the dongle 110 is permanently matched or synced to a particular vehicle 170 through matching or syncing to all or at least some of the VIN of the vehicle 170. In one embodiment, the dongle processor 113 stores all or at least part of the VIN of the vehicle 170, such as the last six values of the VIN. In one embodiment, a unique stock number of the vehicle is used additionally or alternatively to the VIN.

In one embodiment, the dongle is a smart dongle such that may, e.g., interact directly with a user 132 without use of user device 130. The phrase "smart device" means a wired or wireless context-aware electronic device capable of performing autonomous computing and connecting to other devices for data exchange.

The dongle processor 113 also monitors the status or state of vehicle 170 and controls changes to some vehicle 170 states by way of vehicle controller 174. (The term "state" means a group of variables or characteristics that defines the condition of an entity, such as locked state of a vehicle, unlocked state of a vehicle, fuel state of a vehicle, etc.). In one embodiment, the dongle processor 113 controls the vehicle locking state by way of the vehicle controller 174, such as controlling whether the vehicle is in an unlocked state or a locked state and/or control the vehicle ignition mechanism. Stated another way, the dongle processor 113 may send a communication to the vehicle controller 174 to change the vehicle 170 from a locked state to an unlocked state. Thus, the dealership employee user may, for example, unlock, lock, start a vehicle and track the vehicle using GPS information stored in the navigation system of the vehicle (all data that may be recorded by the system).

The vehicle state may comprise any vehicle state known to those skilled in the art, to include, e.g., vehicle engine status such as on or off, vehicle oil pressure, vehicle alternator reading, vehicle battery temperature, one or more vehicle subsystem status such as interior lights on or off, headlights on or off, vehicle location (e.g., as provided by a GPS device), vehicle speed, engine RPM, and the like. Stated another way, the vehicle 170 may have several vehicles states, such as a locked state and an unlocked state, an energy state such as degree of fueling such as fully fueled (with gasoline) or half-fueled, 90% (electrically) charged, etc.

The vehicle controller 174 may be any commercially available controller or controller combination for a vehicle 170, such as one or more of an on-board diagnostics (OBD) controller, a telematic control unit (TCU), an electronic control unit (TCU), and/or an (ECU) Electronic Control Module and or Engine Control Module. The vehicle controller 174 may comprise a set of components or devices, e.g., a relay box and a fuse box. The dongle 110 may couple to or communicate with components of a vehicle controller 174, such as a relay box and/or a fuse box.

The central device 150 comprises a central transceiver 151, central database 155, central GUI 154, central analytics engine 158, and central processor 153. The central device 150 generally provides management of user 132 interactions with vehicle 170 by way of the dongle device 110, records data regarding those interactions, and provides an ability to perform data analysis using the central analytics engine 158 regarding those data and interactions. Central transceiver 151 communicates with one or both of user device 130 and vehicle dongle 110, respectively by comm two 182 and comm three 183.

The data recorded by way of central processor 153 and stored and accessed by way of central database 155 allow data analysis (in one embodiment, through use of the central analytics engine 158) of a user salesperson's 132 interaction with vehicle 170, such as a user's interaction with the vehicle at states of the vehicle (e.g., when the vehicle is parked at a particular location, changes in vehicle state such as vehicle locked or unlocked, vehicle ignition turned on or off, vehicle dashboard or other system activated, etc.). For example, the data may allow determination and/or analysis of time spent with a vehicle, how many vehicles the salesman user showed by model, color, trim package, and any selectable data for dealership administrators and management to track, e.g., salesperson performance and which cars, colors, and trims are the most popular. Such data may then be compared against other sales employees (whose data is similarly recorded) to provide a comparison between employees, or identify trends in showing of certain types or styles of vehicles (e.g., fully electrically powered sedans are shown twice as often as gasoline powered sedans and 50% more than plug-in hybrid vehicles (PHEVs)). As another example, the data may be used by Human Resources or others to prove productivity of sales employee and evaluate efficiency. (It is very difficult to prove a sales employee is not doing their job or to measure their performance. The disclosed system provides proof and scope of work).

The central database 155 may also store and maintain data associated with the parties that engage a user regarding a vehicle. Such a party may be a perspective buyer of the vehicle. Such data may be provided by way of a driver's license in order to test drive the vehicle and may be used, e.g., in aggregate form (so as to protect privacy and/or conform to privacy standards) to associate with sales employee users.

These data and analysis results may be accessible through a dealership portal on any computer by an administrator to create sales reports, to include by way of central GUI 154. In one embodiment, the data and analysis associated with the central device 150, central database 155, central GUI 154, and/or central processor 153 are provided by an app and/or reside on and/or are associated with the cloud (see definition below).

Central processor 153, in some embodiments by way of or in concert with or exclusively by the central analytics engine 158, provides a data analysis capability of the afore-mentioned user-vehicle interaction data, receiving data analysis input via central GUI 154. Central processor 153 also controls and manages central database 155, which stores and maintains system data, to include user-vehicle interaction data and user terms and conditions data 155 and vehicle terms and conditions data 156.

As an example of data recording, the user 130 may, through the user device 130, communicate via comm one 181 to the dongle transceiver 111 a command that the vehicle 170 state is to be changed from a locked state to an unlocked state, the command being made a time stamp one value. The dongle transceiver 111 passes the command to the dongle processor 113 which, by way of dongle-vehicle connection 184, passes the command to the vehicle controller 174 which changes the vehicle 170 state to unlocked, thus allowing the user 132 access to the vehicle. Time stamp one value is recorded by the central database 155. Similarly, a user 132 commanding locking of the vehicle 170 at time stamp two value is recorded by the central database 155. Similar scenarios and capabilities may be provided by these components to record or monitor any vehicle state condition, e.g., to monitor or record the operational state (on or off, e.g.) of a dashboard central display.

In one embodiment, the central database 155 and/or all or some elements of the central device 150 operate in the cloud.

(The phrase "cloud computing" or the word "cloud" refers to computing services performed by shared pools of computer resources, often over the Internet). In one embodiment, some or all of the computing or services or operations of the central processor 153 are performed in the cloud.

In one embodiment, the user device 130 and/or the central device 150 (and/or associated components, such as the central analytics engine 158) operate in a respective client-server arrangement. (The phrase "client-server" or "client-server architecture" means a shared computer architecture in which the server hosts, delivers and manages the majority of the resources (e.g., computing resources) and services to be consumed by a client. There may be multiple clients connected to a single server over a network or internet connection; e.g., see FIG. 3 in which multiple users aka clients are engaged with central device 350 server.

The user terms and conditions 155 data generally define system operating parameters for a particular user 132, to include operating parameters as to a particular user 132 scenarios in which a particular user 132 may access a particular vehicle 170. For example, a particular user 132 may only be allowed access to vehicles with automatic transmissions (because that user 132, e.g., is unable to drive a manual transmission vehicle), or only allowed access during certain work hours, or only allowed to drive the vehicle within a designated geographic area, etc. User access to a particular vehicle may be, for example, limited to engaging a particular vehicle based on the state of the vehicle. For example, a user may only access or unlock a particular vehicle when the vehicle is within a certain geographic boundary (thus, the vehicle state is within those boundaries), or may be able to drive the vehicle only below a certain RPM or speed (thus, the vehicle state must be at or below the certain RPM state or speed state). As another example, a user may be restricted from altering certain vehicle states, e.g., a particular user may not be allowed or authorized to change selectable driving modes of a vehicle such as a Tesla's highest level of driving aggression/assertiveness. User terms and conditions may be coupled to vehicle states, e.g., a particular user may not be allowed to operate a gaming feature on a dashboard display when the vehicle is in a moving state i.e., the vehicle speed state is non-zero.

The vehicle terms and conditions 156 data generally define operating parameters for a particular vehicle 170. For example, a particular vehicle 170 may be prohibited from starting yet available for access only because the vehicle is being held for a potential buyer and promised not to be driven until that potential buyer arrives to test drive the vehicle. As another non-limiting example, the vehicle may be limited in engine RPM, engine torque, vehicle speed, geographic range or area where it may be driven, restricted to non-highway roads or limited to only certain roads, etc. The vehicle terms and conditions 156 data may be varied or established or operate as a function of a particular user. Stated another way, the vehicle terms and conditions 156 data may be related to or coupled to the user terms and conditions 155 data, and vice versa.

Figure 2:
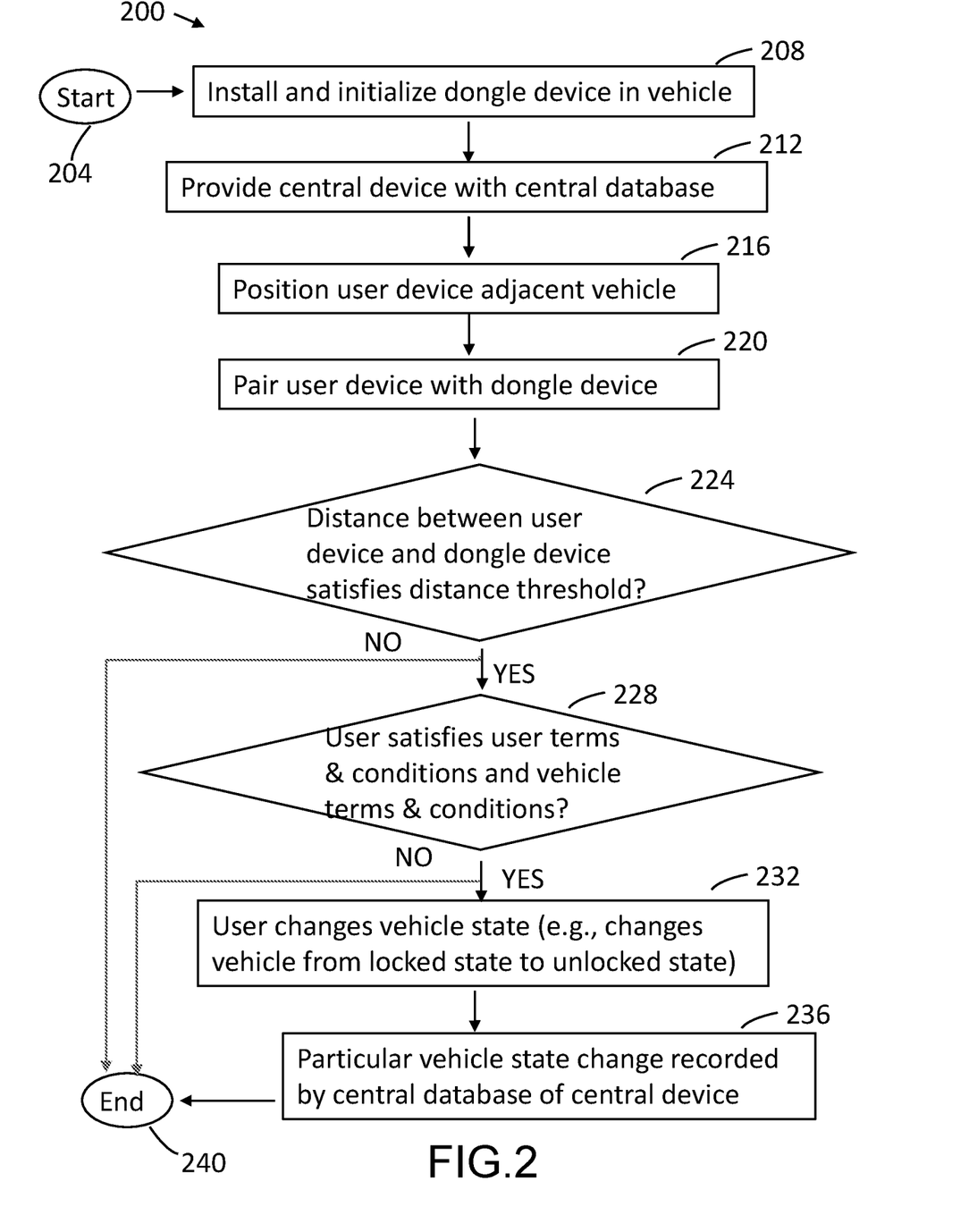
FIG. 2 is a flow chart of one embodiment of a method of use of the fleet vehicle access management system of FIG. 1.

FIG. 2 is a flow chart of one embodiment of a method of use 200 of the vehicle access management system 100 of FIG. 1. Note that in some embodiments, some functions (e.g., any of the identified elements numbered 208-236) may be absent, occur in a different order, or include other functions or steps not shown. A method of use 200 depicted in FIG. 2 will now be described, with reference to aspects and features of the system of FIG. 1 described above.

After starting at step 204, the method 200 proceeds to step 208. At step 208, the dongle device is installed into a vehicle at vehicle-dongle connection to form a connection with a vehicle controller, as described above. The connection may, for example, be a plug-in connection at the OBD2 port of the vehicle (or, e.g., other electronic ports of a vehicle, to include the relay box, the fuse box, etc.) and may involve or require all or at least part of the vehicle 170 VIN. Once the dongle is connected or plugged into the vehicle, an initialization may occur such that the dongle is solely or exclusively or uniquely matched with the vehicle, such that the dongle will match or operate with any other vehicle. After completing step 208, the method 200 proceeds to step 212.

At step 212, a central device with central database is provided, the central device as described above. After completing step 212, the method 200 proceeds to step 216.

At step 216, a user positions a user device (as described above) adjacent to the vehicle at a first distance. The first distance may be measured by any of several means known to those skilled in the art, to include by way of signal analysis of the communications between the user device and the dongle. After completing step 216, the method 200 proceeds to step 220.

At step 220, the dongle devices and user device are paired. In one embodiment, the two devices are paired by way of blue tooth communication protocol. After completing step 220, the method 200 proceeds to step 224.

At step 224, a query is made to determine if the first distance of step 216 satisfies a selectable distance threshold. The distance threshold may be selectable by a person interacting with the central device through central device GUI. The distance threshold, stored on the central database, is compared against the first distance. If the query response is YES (meaning the first distance is at or below the selectable threshold distance), the method 200 proceeds to step 228. If the query response is NO (meaning the first distance above the selectable threshold distance), the method 200 proceeds to step 240 and the method ends. (In one embodiment, the system may automatically return a vehicle to a locked state if a user, first satisfying the distance threshold query, then exceeds it. For example, after showing a vehicle to a customer, the dongle may automatically lock the vehicle via a proximity sensor; when the signal is no longer present the vehicle automatically locks).

At step 228, a query is made to determine if the user satisfies user terms and conditions and vehicle terms and conditions to access the vehicle. If the query response is YES (meaning the user satisfies both user terms and conditions and vehicle terms and conditions to access the vehicle), the method 200 proceeds to step 232. If the query response is NO (meaning the user does not satisfy at least one of the user terms and conditions and the vehicle terms and conditions to access the vehicle), the method 200 proceeds to step 240 and the method ends.

At step 232, the user changes the vehicle state, via the process and components described above involving sending a command from the user device to the dongle, which in turn sends a command to the vehicle controller. Note that other state changes are possible, other than and including a vehicle locking state change. For example, the user may simply command the dongle to provide gasoline fuel status or electrical charge status, without unlocking the vehicle. After completing step 232, the method 200 proceeds to step 236.

At step 236, the vehicle state parameters and any changes to such parameters during interaction with the user (e.g., time of state change) are recorded at central database. After completing step 236, the method 200 proceeds to step 240 and the method ends.

Figure 3:
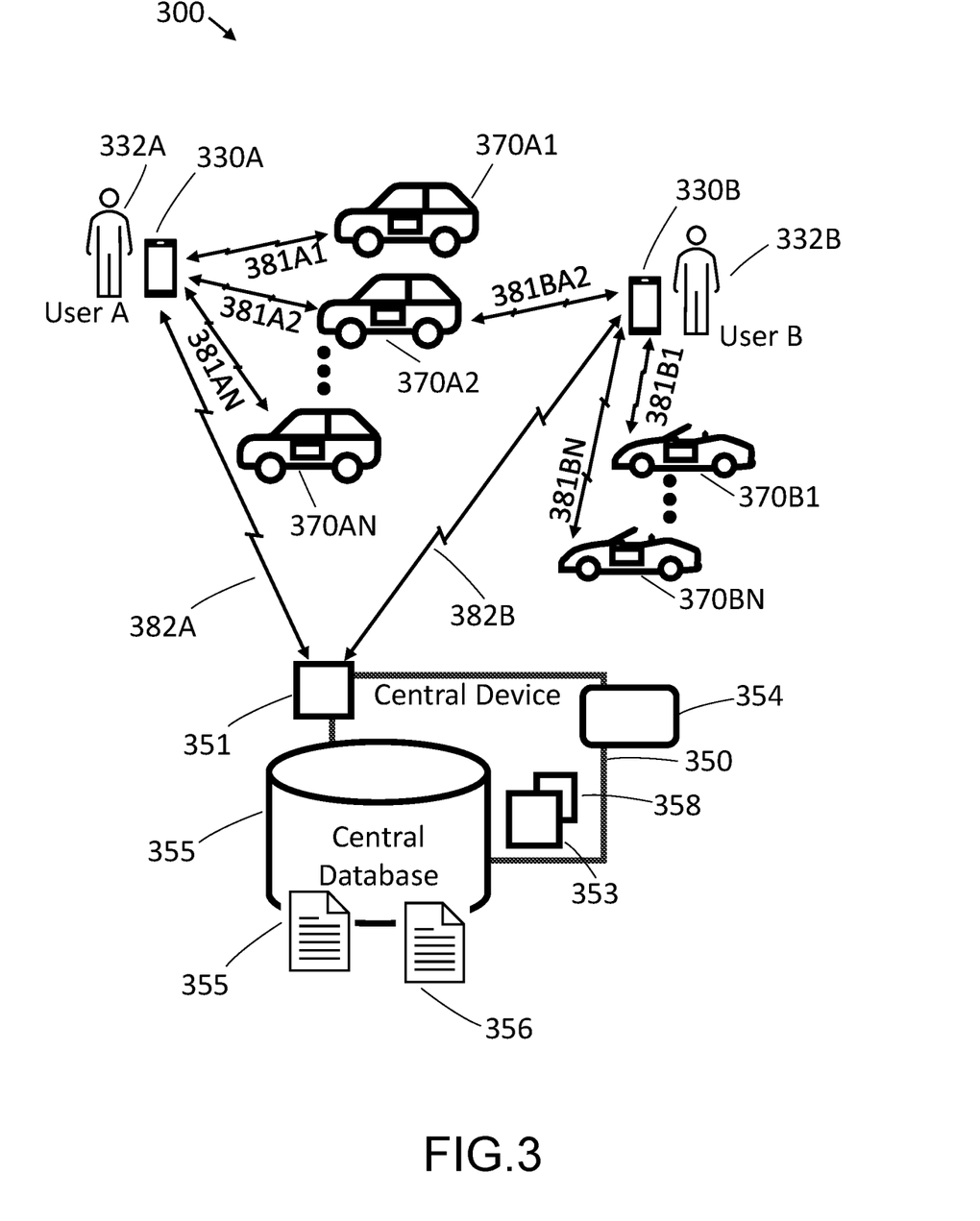
FIG. 3 is a depiction of another embodiment of a vehicle fleet and access management system of the disclosure.

FIG. 3 is a depiction of another embodiment of a vehicle access management system 300 of the disclosure, describing the system in a multi-user and multi-vehicle configuration. The system 300 is similar to the system 100 of FIG. 1.

A set of two users, user A 332A with user A device 330A and user B 332B with user B device 330B, are depicted. The set of users operate in an environment with multiple vehicles shown as vehicles broadly of two categories: a type A category identified as 370A1, 370A2 through 370AN, and a type B identified as 370B1 through 370BN. Each of the vehicles are mapped to or associated with a vehicle terms and conditions 356 data set or data file of central database 355. (Central device 350 similar to central device 150 of FIG. 1, and comprising central GUI 354, central processor 353, central transceiver 351, central analytics engine 358, central database 355 comprising user terms and conditions 355 and vehicle terms and conditions 356). Each of the two users, user A 332A and user B 332B, map to or are associated with a user terms and conditions 355 data set or data file of central database 355.

The user terms and conditions 355 establish allowed access for each user to the set of vehicles. For example, user A 332A is allowed access to the set of vehicles 370A1, 370A2 through 370AN, and specifically not allowed access to the category B vehicles depicted as vehicles 370B1 through 370BN (e.g., the category B vehicles may be high-performance or exotic vehicles). Stated another way, the user terms and conditions 355 for user 332A would identify the set of vehicles 370A1, 370A2 through 370AN as those authorized for access by the user 332A; those vehicles not identified (e.g., vehicles 370B1 through 370BN) are not authorized for access by user 332A. In contrast, user B 332B is authorized (i.e., allowed) access to the set of vehicles 370A1, 370A2 through 370AN and allowed access to the category B vehicles depicted as vehicles 370B1 through 370BN.

The vehicle terms and conditions 356 may also additionally or alternately establish allowed access for each vehicle to the set of users. For example, each of the set of vehicles 370A1, 370A2 through 370AN may identify both of users 332A and 332B are authorized for access, while each of the set of vehicles 370B1 through 370BN would identify user 332B as authorized for access while not identifying user 332A as authorized for access.

Each of the users 332A and 332B communicate by way of respective user devices 330A and 330B with dongles of authorized vehicles. For example, user 332A engages each of vehicles 370A1, 370A2 through 370AN by way of respective comm one 381A1, 381A2 through 381AN. Also, for example, user 332B engages vehicle 370BA2 via comm one 381B2, vehicle 370B1 via comm one 381B1, and vehicle 370BN via comm one 381BN.

Each of the users 332A and 332B communicate with central transceiver 351 of central device 350 by way of respective comm two of 382A and 382B. (Although not depicted to improve clarity of FIG. 3, each dongle of each vehicle of FIG. 3 may communicate directly with central device 350 via central device transceiver 351.)

Figure 4:
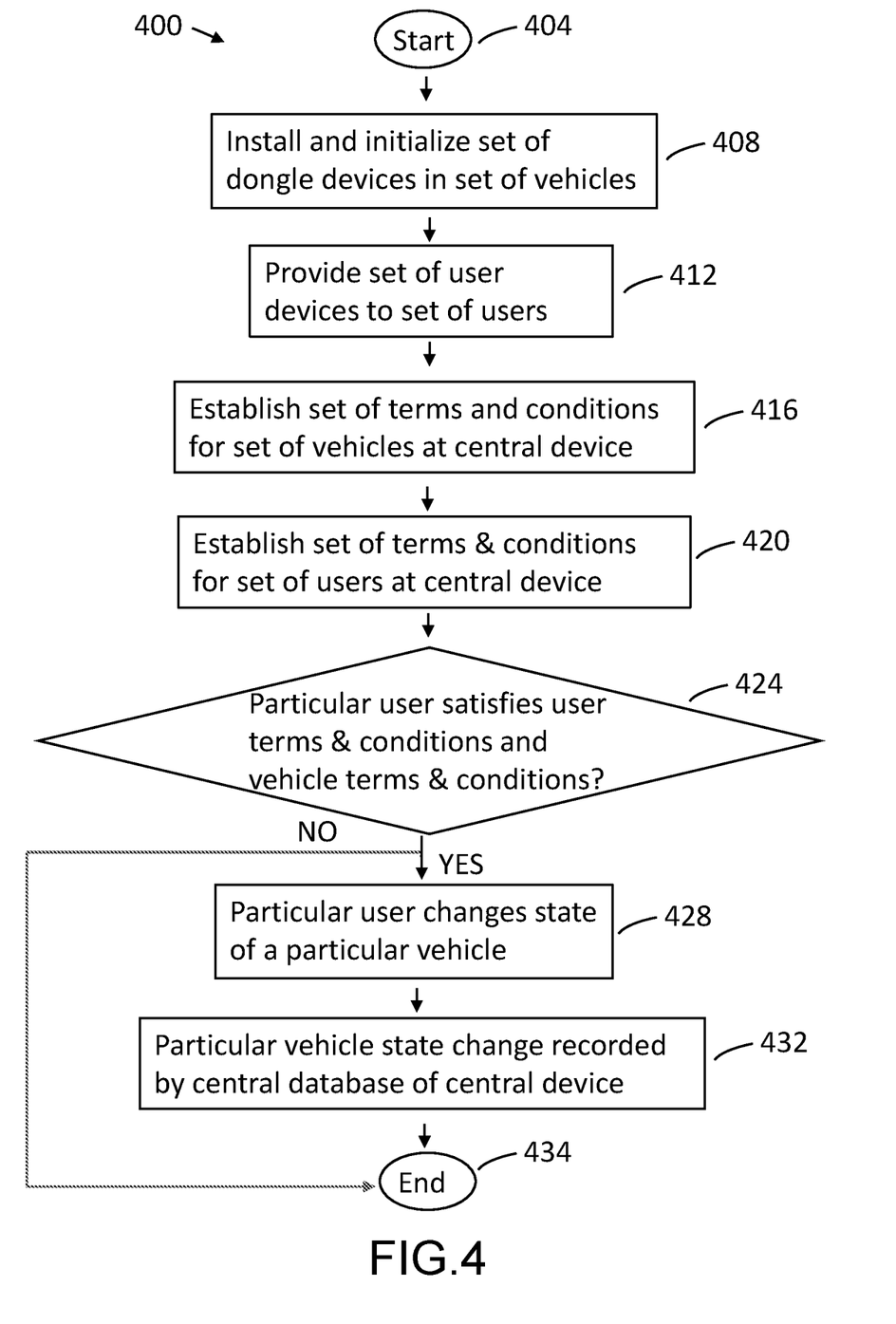
FIG. 4 is a flow chart of one embodiment of a method of use of the fleet and vehicle access management system of FIG. 3.

FIG. 4 is a flow chart of one embodiment of a method of use 400 of the vehicle access management system 300 of FIG. 3. Note that in some embodiments, some functions (e.g., any of the identified elements numbered 408-432) may be absent, occur in a different order, or include other functions or steps not shown. A method of use 400 depicted in FIG. 4 will now be described, with reference to aspects and features of the system of FIGS. 1-3 described above.

After starting at step 404, the method 400 proceeds to step 408. At step 408, a set of dongles, each associated and paired with a respective set of vehicles, are installed in the respective vehicles and initialized. The initialization may include permanent paring or permanent unique coding of each dongle to a particular vehicle. After completing step 408, the method 400 proceeds to step 412.

At step 412, a set of user devices are provided to each of a set of users of the vehicle access management system. After completing step 412, the method 400 proceeds to step 416.

At step 416, terms and conditions for each of the set of vehicles are established and stored in the central database. The terms and conditions may be entered by way of central GUI. After completing step 416, the method 400 proceeds to step 420.

At step 420, terms and conditions for each of the set of users are established and stored in the central database. The terms and conditions may be entered by way of central GUI. After completing step 420, the method 400 proceeds to step 424.

At step 424, a query is made to determine if a particular user satisfies user terms and conditions for a particular vehicle (the particular vehicle is one in which the particular user seeks a state change) and/or satisfies vehicle terms and conditions for the particular vehicle. If the query response is YES, the method 400 proceeds to step 428. If the query response is NO, the method 400 proceeds to step 434 and the method ends.

At step 428, the particular user changes the vehicle state, via the process and components described above involving sending a command from the particular user device to the dongle of the particular vehicle, which in turn sends a command to the vehicle controller of the particular vehicle. After completing step 428, the method 400 proceeds to step 432.

At step 432, the state change parameters of the particular vehicle (e.g., time of state change) and absolute state values (e.g., vehicle speed, location, system status such as entertainment and/or operating system states) are recorded at the central database. Stated another way, the system records the complete set of data associated with each users' engagement with each vehicle engaged, to include vehicle state data. (Although not shown as a step in FIG. 4, data analysis, such as by way of data analytics engine 358, may then be performed with respect to data recorded in the central database). After completing step 432, the method 400 proceeds to step 434 and the method 400 ends.

Figure 5:
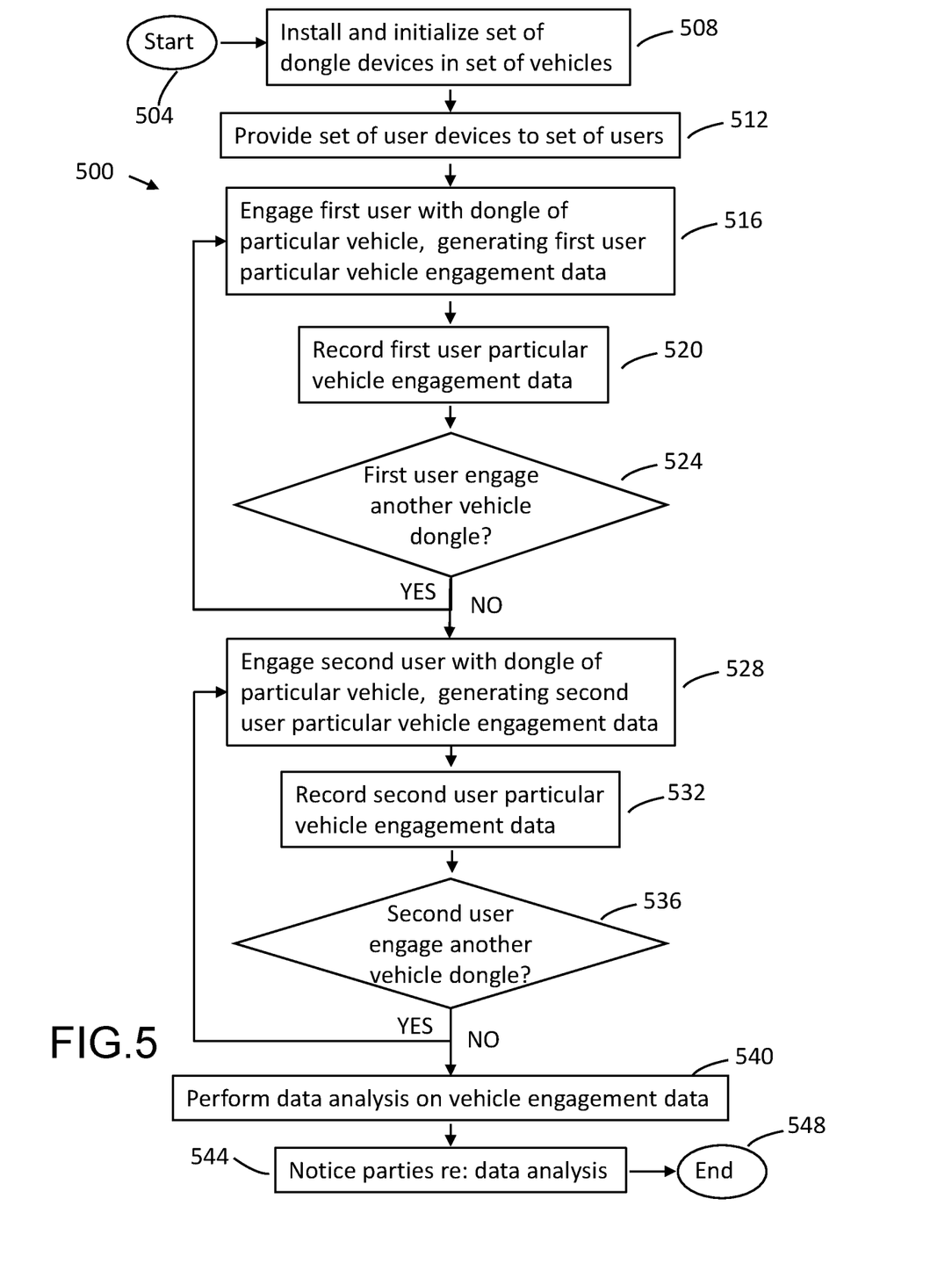
FIG. 5 is a flow chart of another embodiment of a method of use of the vehicle fleet and access management system of FIG. 3.

FIG. 5 is a flow chart of another embodiment of a method of use 500 of the vehicle fleet and access management system 300 of FIG. 3. Note that in some embodiments, some functions (e.g., any of the identified elements numbered 508-544) may be absent, occur in a different order, or include other functions or steps not shown. A method of use 500 depicted in FIG. 5 will now be described, with reference to aspects and features of the system of FIGS. 1-4 described above.

After starting at step 504, the method 500 proceeds to step 508. At step 508, a set or plurality of dongle devices are installed and initialized in a set or plurality of vehicles. Each dongle is uniquely coupled or connected to a particular vehicle. Stated another way, the initialization may include permanent paring or permanent coding of each dongle to a particular vehicle. After completing step 508, the method 500 proceeds to step 512.

At step 512, a set of user devices are provided to each of the set of users of the vehicle fleet and access management system. A particular user device may be configured to engage a (complete or partial) set of the set of dongles of the set of vehicles. After completing step 512, the method 500 proceeds to step 516.

At step 516, a first user engages with a dongle associated with a particular vehicle (such as a first dongle of a first vehicle). Such an engagement or contact is recorded by the system at one or more of the central processor 353 and the central database 355. If the first user is authorized to initiate an action associated with the particular vehicle (by way of satisfaction of one or both of the first user terms and conditions and the particular vehicle terms and conditions, as described above), such as unlock the vehicle, turn the vehicle's engine on, etc., then such action is executed, and first user particular vehicle engagement data associated with the action is generated. After completing step 516, the method 500 proceeds to step 520.

At step 520, the first user particular vehicle engagement data is communicated to the central device and recorded by the central device (e.g., by or at the central database). The first user particular vehicle engagement data is communicated to the central device by communication between the particular dongle of the particular vehicle and the central device and/or by communication between the first user device and the central device. After completing step 520, the method 500 proceeds to step 524.

At step 524, a query is made to determine if the first user is to engage another vehicle (e.g., a second vehicle with an associated or paired second dongle device). If the query response is YES, the method 500 proceeds to step 516. If the query response is NO, the method 500 proceeds to step 528.

At step 528, a second user engages with a dongle associated with a particular vehicle (such as a third dongle of a third vehicle). Such an engagement or contact is recorded by the system at one or more of the central processor 353 and the central database 355. If the second user is authorized to initiate an action associated with the particular vehicle (by way of satisfaction of one or both of the second user terms and conditions and the particular vehicle terms and conditions, as described above), such as unlock the vehicle, turn the vehicle's engine on, etc., then such action is executed, and second user particular vehicle engagement data associated with the action is generated. After completing step 528, the method 500 proceeds to step 532.

At step 532, the second user particular vehicle engagement data is communicated to the central device and recorded by the central device (e.g., by or at the central database). The second user particular vehicle engagement data is communicated to the central device by communication between the particular dongle of the particular vehicle and the central device and/or by communication between the second user device and the central device. After completing step 532, the method 500 proceeds to step 536.

At step 536, a query is made to determine if the second user is to engage another vehicle (e.g., a fourth vehicle with an associated or paired fourth dongle device). If the query response is YES, the method 500 proceeds to step 528. If the query response is NO, the method 500 proceeds to step 540.

At step 540, data analysis is performed on all or part of the set of vehicle engagement data collected. The set of vehicle engagement data collected may comprise all interactions of all users with groups or collections of vehicles, as described above. Stated another way, the system may assess or analyze all or a subset of the data associated with each users' engagement with each vehicle engaged, to include vehicle state data of each engaged vehicle. After completing step 540, the method 500 proceeds to step 544.

At step 544, a notice may be provided to various parties (e.g., one or more users, vehicle fleet management user(s), etc.) as to some or all of the results of the data analysis of step 540. The notice may be in any form or format known to those skilled in the art, to include, e.g., a text message to a particular user, printed reports comparing user's activities, stored report or tables comparing users or comparing vehicles against or relative to users, and the like. After completing step 544, the method 500 proceeds to step 548 and ends.

Note that although the vehicle access system and method of use has focused on vehicle sales dealerships, the system and method may be applied in other environments. For example, the system and method could be used in management of rental vehicle fleets (e.g., car rentals at airports, moving trucks, business fleets of vehicles, etc.).

Also, the vehicle access system and method of use may be used to support public health concerns such as pandemic (e.g., covid) concerns. For example, the data recording of user access to vehicles may be used to support or enable virus contact tracing investigations or analysis.

The exemplary systems and methods of this disclosure have been described in relation to managing, controlling, documenting and analysis of user access to a set of vehicles such as in a vehicle dealership setting. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A vehicle fleet and access management system comprising:
   a first dongle device configured to communicate with a first vehicle controller of a first vehicle, the first dongle is permanently coded to a first vehicle VIN and the first vehicle controller stores at least part of the first vehicle VIN, the first vehicle having a set of first vehicle states comprising a first vehicle lock state, the first vehicle controller operating to at least set the first vehicle lock state to locked and unlocked;
   a first user device of a first user, the first user device configured to communicate with a first set of dongle devices comprising the first dongle device; and
   a central device comprising a central database;
   wherein:
   when the first user device is authorized to set the first vehicle lock state and when the first dongle device is communicating with the first vehicle controller:
      the first user device communicates with the first dongle device to change, at a time stamp one value, the first vehicle locked state from locked to unlocked;
      the first user device communicates with the first dongle device to change, at a time stamp two value, the first vehicle lock state from unlocked to locked; and
      the first user device communicates the time stamp one value and the time stamp two value to the central device; and
   the central device records the time stamp one value and the time stamp two value.

2. The system of claim 1, wherein the first dongle device communicates with an on-board diagnostics port of the first vehicle.

3. The system of claim 1, wherein the communication between the first user device and the first dongle device is wireless communication.

4. The system of claim 1, wherein: the central device stores a first vehicle set of terms and conditions associated with access control to the first vehicle; and the first user device is authorized to change the first vehicle lock state only when the first vehicle set of terms and conditions are satisfied.

5. The system of claim 1, wherein the first user, by way of the first user device, communicates at least part of the first vehicle VIN to the first dongle device to enable the first dongle device to change the first vehicle lock state from locked to unlocked.

6. The system of claim 5, wherein:
   the set of first vehicle states further comprises at least one of first vehicle fuel level and first vehicle engine status; and
   the central device further records the set of first vehicle states when the first dongle device is communicating with the first vehicle controller.

7. The system of claim 5, wherein:
   the first set of dongle devices further comprises a second dongle device configured to communicate with a second vehicle controller of a second vehicle, the second vehicle having a set of second vehicle states;
   when the first user device is authorized to set a second vehicle lock state and when the second dongle device is communicating with the second vehicle controller:
      the first user, by way of the first user device, communicates at least part of the second vehicle VIN to the second dongle device to enable the second dongle device to change the second vehicle lock state from locked to unlocked; and
   the central device further records the set of second vehicle states when the second dongle device is communicating with the second vehicle controller.

8. The system of claim 7, further comprising a second user device of a second user, the second user device configured to communicate with a second set of dongle devices comprising the first dongle device, the second dongle device, and a third dongle device configured to communicate with a third vehicle controller of a third vehicle, the third vehicle having a set of third vehicle states; wherein:
   when the second user device is authorized to set a third vehicle lock state and when the third dongle device is communicating with the third vehicle controller:
      the second user, by way of the second user device, communicates at least part of the third vehicle VIN to the third dongle device to enable the third dongle device to change the third vehicle lock state from locked to unlocked; and the central device further records the set of third vehicle states when the third dongle device is communicating with the third vehicle controller.

9. A method of vehicle fleet and access management, the method comprising:

providing a first dongle device configured to communicate with a first vehicle controller of a first with vehicle, the first dongle is permanently coded to a first vehicle VIN and the first vehicle controller stores at least part of the first vehicle VIN, the first vehicle having a set of first vehicle states comprising a first vehicle lock state, the first vehicle controller operating to at least set the first vehicle lock state to locked and unlocked;

installing the first dongle device in the first vehicle;

providing a first user device to a first user, the first user device configured to communicate with a first set of dongle devices comprising the first dongle device;

providing a central device comprising a central database;

positioning the first user device adjacent the first vehicle at a first distance;

establishing communication between the first user device and the first dongle device;

determining if the first user device is authorized to set the first vehicle lock state;

wherein if the first user device is authorized to set the first vehicle lock state:

communicating an instruction, at a first time stamp one value, from the first user device to the first dongle device to change the first vehicle from locked to unlocked;

communicating an instruction, at a first time stamp two value, from the first user device to the first dongle device to change the first vehicle from unlocked to locked; and recording, on the central device, the first time stamp one value and the first time stamp two value.

10. The method of claim 9, wherein the first dongle device is coupled to an on-board diagnostics port of the first vehicle and the communication between the first user device and the first dongle device is wireless communication.

11. The method of claim 9, wherein the central device stores a first vehicle set of terms and conditions associated with access control to the first vehicle; and the first user device is authorized to set the first vehicle lock state only when the first vehicle set of terms and conditions are satisfied.

12. The method of claim 11, wherein:

the set of first vehicle states further comprises at least one of first vehicle fuel level and first vehicle engine status; and the central device further records the set of first vehicle states when the first dongle device is communicating with the first vehicle controller.

13. The method of claim 9, wherein the first user, by way of the first user device, communicates at least part of the first vehicle VIN to the first dongle device to enable the first dongle device to change the first vehicle from locked to unlocked.

14. The method of claim 9, wherein if the first distance exceeds a selectable threshold distance, the first vehicle remains locked or changes to locked.

15. The method of claim 9, further comprising the steps of:

providing a second dongle device configured to communicate with a second vehicle controller of a second vehicle, the second vehicle having a set of second vehicle states comprising a second vehicle lock state, the second vehicle controller operating to at least set the second vehicle lock state to locked and unlocked;

installing the second dongle device in the second vehicle;

establishing communication between a second user device and the second dongle device;

determining if the first user device is authorized to set the second vehicle lock state;

wherein if the first user device is authorized to set the second vehicle lock state:

the first user, by way of the first user device, communicates at least part of the second vehicle VIN to the second dongle device to enable the second dongle device to change the second vehicle lock state from locked to unlocked; and the central device further records the set of second vehicle states when the second dongle device is communicating with the second vehicle controller.

16. The method of claim 15, further comprising the steps of:

providing the second user device to a second user, the second user device configured to communicate with a second set of dongle devices comprising the first dongle device, the second dongle device, and a third dongle device configured to communicate with a third vehicle controller of a third vehicle, the third vehicle having a set of third vehicle states;

determining if the second user device is authorized to set the third vehicle lock state;

wherein if the second user device is authorized to set the third vehicle lock state:

the second user, by way of the second user device, communicates at least part of the third vehicle VIN to the third dongle device to enable the third dongle device to change the third vehicle lock state from locked to unlocked; and the central device further records the set of third vehicle states when the third dongle device is communicating with the third vehicle controller.

17. A vehicle fleet management system comprising:

a plurality of dongles configured to uniquely communicate with a vehicle controller of a respective plurality of vehicles, each of the plurality of vehicles having a plurality of vehicle states comprising a vehicle lock state of locked and unlocked;

a plurality of users, each user associated with a respective plurality of user devices, each of the plurality of user devices configured to communicate with each of the plurality of dongles; and a central device comprising a central analytics engine, a central database storing a set of terms and conditions for engagement by each of the plurality of users with respect to each of the plurality of vehicles, and a central processor configured to determine satisfaction of each of the plurality of users with the set of terms and conditions for each of the plurality of vehicles;

wherein:

a first user device of a first user of the plurality of users communicates with a first dongle of a first vehicle and, if the central processor determines the first user satisfies the set of terms and conditions of the first vehicle, the first vehicle user device instructs the first dongle to set one or more first vehicle states of the first vehicle and first vehicle state data are recorded by the central database;

a second user device of a second user of the plurality of users communicates with a second dongle of a second vehicle and, if the central processor determines the second user satisfies the set of terms and conditions of the second vehicle, the second vehicle user device instructs the second dongle to set one or more second vehicle states of the second vehicle and second vehicle state data are recorded by the central database;

the one or more first vehicle states is a first vehicle lock state and the first vehicle state data comprise a time of the first dongle setting the first vehicle lock state;

the one or more second vehicle states is a second vehicle lock state and the second vehicle state data comprise a time of the second dongle setting the second vehicle lock state;

the first dongle is permanently coded to a first vehicle VIN and the first vehicle controller stores at least part of the first vehicle VIN; and the second dongle is permanently coded to a second vehicle VIN and the second dongle stores at least part of the second vehicle VIN.

18. The vehicle fleet management system of claim 17, wherein:

the first user device communicates with a plurality of dongles of a respective plurality of vehicles and sets at least one vehicle state of each of the plurality of vehicles, the vehicle state of each of the plurality of vehicles recorded by the central database and accessed by the central analytic engine;

the second user device communicates with a plurality of dongles of a respective plurality of vehicles and sets at least one vehicle state of each of the plurality of vehicles, the vehicle state of each of the plurality of vehicles recorded by the central database and accessed by the central analytic engine; and the central analytics engine tabulates vehicle state of each of the second of vehicles as a function of time and user device.

* * * * *